US006793702B2

(12) United States Patent
Eswarappa

(10) Patent No.: US 6,793,702 B2
(45) Date of Patent: Sep. 21, 2004

(54) FILTER CARTRIDGE PLATFORM AND FILTER CARTRIDGE FOR USE ON THE PLATFORM

(76) Inventor: Muniyapla Eswarappa, 2 McKenney Cir., Andover, MA (US) 01810

( * ) Notice: Subject to any disclaimer, the term of this patent is extended or adjusted under 35 U.S.C. 154(b) by 104 days.

(21) Appl. No.: 09/892,765

(22) Filed: Jun. 28, 2001

(65) Prior Publication Data

US 2002/0017085 A1 Feb. 14, 2002

Related U.S. Application Data

(60) Provisional application No. 60/214,862, filed on Jun. 28, 2000.

(51) Int. Cl.[7] .......................... B01D 46/02; B01D 46/12

(52) U.S. Cl. .......................... 55/484; 55/385.1; 55/495; 55/505; 55/506; 55/511; 55/DIG. 33; 55/DIG. 35; 128/206.17

(58) Field of Search .......................... 55/482, 484, 490, 55/497, 505, 506, 507, 511, DIG. 33, DIG. 35, 385.1, 495; 128/202.27, 205.27, 205.29, 206.17, 206.21

(56) References Cited

U.S. PATENT DOCUMENTS 2,055,853 A 9/1936 Schwartz ..................... 183/45
2,062,834 A * 12/1936 Schwartz ............... 55/DIG. 35
2,065,775 A 12/1936 Wahlert ....................... 183/44
2,130,555 A 9/1938 Malcom ...................... 183/71
2,227,959 A 1/1941 Cover ......................... 183/71
2,235,624 A 3/1941 Schwartz ..................... 183/44
2,521,060 A 9/1950 Hallinan ..................... 210/183
2,744,525 A 5/1956 Whipple ..................... 128/146
2,787,333 A 4/1957 Boone et al. ................ 183/4.3
2,951,551 A 9/1960 West .......................... 183/4.3
3,072,119 A 1/1963 Matheson ................... 128/146
3,161,491 A 12/1964 Gongoll et al. ............... 55/502
3,246,920 A 4/1966 Pall ............................ 285/237
3,606,737 A 9/1971 Lefevre ....................... 55/319

(List continued on next page.)

FOREIGN PATENT DOCUMENTS

EP 0342807 11/1989
EP 0674931 10/1995
FR 747042 * 6/1933
FR 2127360 10/1972
FR 2713939 6/1995

OTHER PUBLICATIONS

Flexi–filter Advertisement; unknown date.

*Primary Examiner*—Duane Smith
*Assistant Examiner*—Jason M. Greene
(74) *Attorney, Agent, or Firm*—Fitzpatrick, Cella, Harper & Scinto

(57) ABSTRACT

A filter platform is provided for allowing attachment of an air filter unit thereto. The filter platform includes: a substantially hollow outer housing, the housing forming a chamber within the platform, the housing having a first opening at one end for engaging the platform with a respirator so as to allow air to flow between the chamber and the respirator, and a second opening for engaging the platform with the air filter unit so as to allow filtered air to flow into the chamber. A respirator connection member is located in association with the first opening, the respirator connection member being structured to sealingly engage the first opening to an input of the respirator, and a filter connection member is located in association with the second opening, the filter connection member being structured to sealingly engage the second opening with the filter unit.

7 Claims, 14 Drawing Sheets

U.S. PATENT DOCUMENTS

| | | | | | |
|---|---|---|---|---|---|
| 4,058,465 | A | | 11/1977 | McKee | 210/356 |
| 4,105,562 | A | | 8/1978 | Kaplan et al. | 210/232 |
| 4,192,750 | A | | 3/1980 | Elfes et al. | 210/133 |
| 4,228,012 | A | | 10/1980 | Pall | 210/238 |
| 4,336,043 | A | | 6/1982 | Aonuma et al. | 55/483 |
| 4,886,056 | A | | 12/1989 | Simpson | 128/201.25 |
| 4,886,058 | A | | 12/1989 | Brostrum et al. | 128/206.12 |
| 5,062,421 | A | | 11/1991 | Burns et al. | 128/205.27 |
| 5,084,175 | A | | 1/1992 | Hoffmeier | 210/344 |
| 5,112,503 | A | | 5/1992 | Raifman | 210/777 |
| 5,211,846 | A | | 5/1993 | Kott et al. | 210/232 |
| 5,230,727 | A | | 7/1993 | Pound et al. | 55/492 |
| 5,405,528 | A | | 4/1995 | Selbie et al. | 210/232 |
| 5,407,571 | A | | 4/1995 | Rothwell | 210/232 |
| 5,453,184 | A | | 9/1995 | Handtmann | 210/193 |
| RE35,062 | E | | 10/1995 | Brostrom et al. | 128/206.12 |
| 5,549,821 | A | | 8/1996 | Bounnakhom et al. | 210/232 |
| 5,579,761 | A | | 12/1996 | Yuschak et al. | 128/206.17 |
| 5,647,356 | A | | 7/1997 | Osendorf et al. | 128/206.17 |
| 5,782,235 | A | * | 7/1998 | Muller et al. | 128/206.17 |
| 5,906,737 | A | | 5/1999 | Hoeppner | 210/232 |
| 5,941,244 | A | | 8/1999 | Yamazaki et al. | 128/206.19 |
| 6,001,145 | A | | 12/1999 | Hammes | 55/471 |
| 6,044,842 | A | * | 4/2000 | Pereira et al. | 55/DIG. 33 |
| 6,055,983 | A | | 5/2000 | Metzger | 128/206.17 |
| 6,216,693 | B1 | * | 4/2001 | Rekow et al. | 128/206.17 |
| 6,382,206 | B1 | * | 5/2002 | Palazzotto et al. | 128/206.17 |
| 2002/0026942 | A1 | * | 3/2002 | Eswarappa | 128/205.29 |

* cited by examiner

FIG. 10A
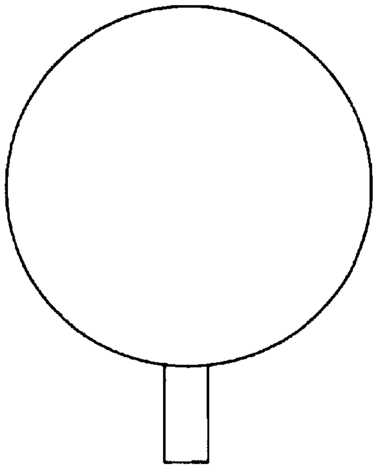
FIG. 10C
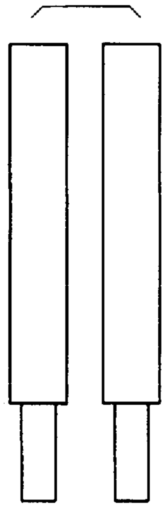
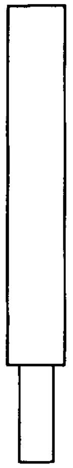
FIG. 10B
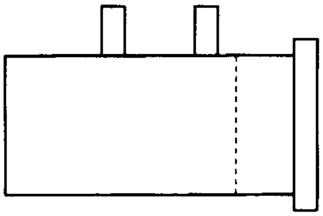
FIG. 10D

FILTER CARTRIDGE PLATFORM AND FILTER CARTRIDGE FOR USE ON THE PLATFORM

CROSS-REFERENCE TO RELATED APPLICATION

This application claims benefit of U.S. Provisional Application No. 60/214,862, filed on Jun. 28, 2000, which is hereby incorporated by reference.

BACKGROUND OF THE INVENTION

1. Field of the Invention

The present invention relates generally to the field of air filter devices. More particularly, filter devices structured for coupling with a breathing apparatus, such as a respirator or mask or other source of suction, and so as to provide the ability to couple one or more filter elements to a filter platform connected to the breathing apparatus, such that the filter elements and platform function together as an integrated filtering device.

2. Description of the Related Art

When a person is subject to adverse breathing conditions, such as in an environment contaminated with airborne particles and/or harmful vapors, that person's safety and health will require some type of device for filtering the air before it passes into his or her lungs. To achieve this goal, requirements for such filtering devices have been codified (42 C.F.R. §84) by the National Institute of Occupational Safety and Health (NIOSH). NIOSH regulations were revised to be made substantially more stringent (in June 1995, with a grandfather clause for three years, effective June 1998), to require that these filtering devices demonstrate increased efficiency, a measure of its ability to remove contaminants from air as it is drawn (breathed) through the filtering device.

Historically, improvements in the efficiency of a filtering device have resulted in a concomitant increase in the difference in air pressure between the environment and the interior of the filtering device required for drawing air through it at a given rate. This pressure differential is commonly referred to as pressure drop of the filtering device. Further, increased efficiency in a filtering device also typically has led to a reduction in the effective life span of the filtering device. Consequently, with prior art filtering devices, greater safety through improved filter efficiency has typically made such devices difficult to breathe through and of extremely limited life span. As a result, in addition to breathing discomforts, users experience frequent periods of down time as they must either leave the work area and/or stop working to remove and replace filtering devices.

Accordingly, it has long been a goal of those in the field of filtering devices to develop a filtering device that meets the natural and codified safety requirements of users while demonstrating a pressure drop that is sufficiently low to allow comfortable breathing by the user and, even more importantly, while functioning effectively for a greater period of time.

To attain such improvements, inventors have manipulated the shapes and sizes of the air filters to maximize surface area in the hope that, with increased area over which filtering can be conducted, acceptable efficiency can be realized while at the same time affording the user a low pressure drop and, thus, comfortable breathing. However, filters can be made only so large before they begin to interfere with a user's vision or mobility. Inventors have also experimented with improved materials in attempted furtherance of the same goals. To date, even slight improvements in efficiency, pressure drop, or life span have been hailed as marked improvements in the art.

One attempt to increase the surface area of the filter is illustrated in U.S. Pat. No. 2,130,555 to Malcolm. The Malcolm patent shows a dust filter unit of a generally tubular form, but having within the unit a filter having a plurality of bellows-like folds. The bellows-like folds provide increased surface area in the filter without the necessity of increasing the diameter of the unit.

The filter unit shown by Malcolm has the advantage of increasing the surface area of the filter medium. However, the folds are part of an integrally formed filter media. Therefore, the design does not permit more or less surface area to be used in accordance with particular needs. Further, the central aperture of each stage reduces the amount of potential surface area of the filter material that is actually used for filtration.

U.S. Pat. No. 2,227,959 to Cover shows a filter composed of three elements connected to one another. The three elements are each structured differently from one another so as to be placed at an assigned position in the filter. However, the device requires specialized innermost and outermost filter elements, which would require that at least three types of filter units be kept in stock at all times. Further the construction of the filter shown in Cover, in which the filter walls are tucked into a cavity in a retaining plate, would be somewhat prone to leakage, compared to modern units in which the filter walls are sealingly engaged to one another around their periphery, and might not meet the more stringent standards in effect today, such as those promulgated by NIOSH. In addition, the central aperture of each stage reduces the amount of potential surface area of the filter material that is actually used for filtration.

U.S. Pat. No. 2,235,624 to Schwartz shows a filter unit for respirators having a cylindrical filter casing of a depth sufficient to hold two disk-shaped filter pads. The filter pad within the casing farthest away from the breathing mask is formed of two circular pads stitched together circumferentially at the edges to form the disk-shaped filter pad, and having an aperture formed through both circular pads to allow a supporting tube element to pass there through. The disk-shaped filter pad closest to the mask is formed similarly but is only apertured on one side. The supporting tube enters the aperture of this innermost pad and comes to an end therein without passing entirely through the innermost pad.

The filter unit taught by Schwartz has several disadvantages. For one thing, the requirement of rigidity of the outer cylindrical filter holder would tend to increase the weight of the mask. Also, the innermost filter pad is of a different construction than the outermost pad, which means that, similar to the situation in the Cover patent, two types of replacement filter elements must be maintained in stock. Further, the central aperture of each stage reduces the amount of potential surface area of the filter material that is actually used for filtration.

U.S. Pat. No. 2,951,551 to West shows an air purifying cannister that is formed from individual filtration units fitted together. Each unit has a male as well as a female connector and a rigid outer wall. The units may be mated in series ad infinitum to form a composite cannister of desired length. Each unit has a tube formed therethrough to allow for the passage of already-filtered air from one unit to the next. The tube is fitted with a cap on the unit farthest from the mask or source of suction to prevent unfiltered air from entering the tube.

The West filter unit, due to the requirement for rigidity, would become very heavy and would be very uncomfortable for the wearer after prolonged use, especially in comparison to the light-weight simple disk filter pad units currently preferred for long term use. Further the weight of the cannister, as additional units are added, would cause a great deal of stress to be applied to the air inlet of any mask using the filter, which may lead to fatigue of the connection materials and eventual breakage. Moreover, the central aperture of each stage reduces the amount of potential surface area of the filter that is actually used for filtration.

A common disadvantage of the types of filter units described above is the high ratio of non-functioning structural materials to functioning filtration material. As a result of this ratio, providing the user with increased filter surface area would result in an associated increase in weight of the filter. Modern filter units are expected to be light in weight, to ensure the comfort of the user.

A prevalent type of light-weight filter pad currently in use is the 3M® P100 Particulate filter, which consists of a single light-weight disk-shaped unit, formed of two fabric filter pads affixed to one another around the circumference of each pad. One of the filter pads has a central aperture being supported around its periphery by a plastic fastener integrally formed with a bayonet-style female connector, formed to enable a locking connection with a counterpart male connector at the input or inputs of a breathing mask.

However, while the 3M® P100 filter pad offers the advantage of light weight, due to its construction it can function only as a single unit. Further, because the pad is soft, installation and removal of the filter pad exerts torsional and crushing stress on the filter material as the user grips and twists the filter to engage or disengage the connector that mates with the mask. Moreover, the central aperture reduces the amount of potential surface area of the filter material that is actually used for filtration.

All of the filters discussed above having apertures punched through the filter material lose the filtration benefits of the material that has been punched out. As a result, a significant amount of the potential usable surface area of filter material is lost. Also, all of the filter devices discussed above utilize a direct connection to the respirator, necessitating a compatibility of filter and respirator design.

Thus, in view of the above deficiencies of the prior art devices, the need exists for a filter unit that is of very light weight and which can be mated to a filter platform. There also is a need for a filter unit that utilizes a greater percentage of its surface area for filtration.

There also is a need for a filter assembly or device in which each filter unit thereof is of identical construction. Further, there is a need for a filter device structured to permit easy installation and removal of individual filter units. Moreover, there is a need for a filter device having an indirect connection between the filter unit or units and the respirator to allow more flexibility in filter design independent of mask design considerations.

One of the very commonly experienced problems in using presently available breath protection equipment, is the difference in the level of protection experienced from the start of a fresh set of filtering units, and the level of protection and breathing comfort towards or at the end of the expected life cycle (end of life,) of these filter units. Most of these filters and filter units do not have an "end of life" indicator. This leaves it up to the user to estimate the life remaining in a filter, which may result in serious breathing discomfort, and sometimes a lack of protection. All of this can lead to the wearer's exhaustion, injury and damage to his or her health, and the resulting loss of productivity. As a result, wearers of these filter devices often end up discarding them long before the end of the expected life span, thereby increasing the cost of protection.

Another difficulty faced by users of filtration devices is the requirement that a monitoring of a change of sequence of a particulate and/or gas and vapor filter be performed.

In light of the foregoing, it becomes clear that a filtering device furthering the seemingly incompatible goal of improving efficiency, maximizing the use of available filter material area, while decreasing pressure drop, increasing the effective life span of the filtering device, and allowing for change of sequence monitoring of the filter, would represent a significant advance over the prior art.

SUMMARY OF THE INVENTION

In view of the above-mentioned problems of prior art devices, and the needs and concerns of users of filtration devices, it is an object of the present invention to provide a filtering device that demonstrates improved efficiency, maximizing the use of available filter material area, while exhibiting reduced pressure drop, an extended usable life span, and ideally a filter unit structured to cooperate with a filter platform, the filter unit or units together with the platform forming the filter device to be mated to the respirator.

It is another object of the invention to provide a filter unit that utilizes 100 percent of the filter material for filtering, without providing an aperture in the filtration material itself.

It is another object of the invention to provide a filter platform that can interface the filter units with the respirator and allow for the installation of end of life probes therein, obviating the need for customizing the respirator to provide such functionality, as well as allow for more flexibility in filter unit design due to the presence of the intermediate structure of the filter platform.

It is another object of the present invention to provide each individual wearer the ability to design fit the total filter device to his own comfort level, and at the same time maintain breathing comfort throughout his work period.

It is another object of the present invention to make it possible to keep very low levels of inventory of filters and filter devices, while providing adequate supply at the same time, by providing identical, interchangeable, and combinable filtration units.

In accordance with one aspect of the present invention, there is provided a filter platform for allowing attachment of an air filter unit thereto. The filter platform comprises: a substantially hollow outer housing, the housing forming a chamber within the platform, the housing having a first opening at one end for engaging the platform with a respirator so as to allow air to flow between the chamber and the respirator, and a second opening for engaging the platform with the air filter unit so as to allow filtered air to flow into the chamber; a respirator connection member located in association with the first opening, the respirator connection member being structured to sealingly engage the first opening to an input of the respirator; and a filter connection member located in association with the second opening, the filter connection member being structured to sealingly engage the second opening with the filter unit.

In accordance with another aspect of the present invention, there is provided a filter unit comprising: a substantially hollow filter pad having first and second walls made of filter material, and an annular edge member spacing apart the first and second walls, each of the first and second walls being sealingly engaged to the annular edge member, the annular edge member having an opening for allowing filtered air to pass out of the filter unit, the annular edge member extending around part or all of the periphery of the filter pad, and a connection member located in association with the opening, for connecting the filter unit to a source of suction.

In accordance with yet another aspect of the present invention, there is provided a filter unit for filtering air to be fed to a respirator through a filter platform comprising an outer housing. The housing forms a chamber within the filter platform, and has a first opening at one end of the housing for engaging the platform with a respirator so as to allow air to flow between the chamber and the respirator, and a second opening for engaging the platform with the air filter unit so as to allow filtered air to flow into the chamber. A respirator connection member is located in association with the first opening, the respirator connection member being structured to sealingly engage the first opening to an input of the respirator. A filter connection member is located in association with the second opening, the filter connection member being structured to sealingly engage the second opening with the filter unit. The filter unit comprises: a substantially hollow filter pad having first and second walls made of filter material, and an annular edge member spacing apart the first and second walls, each of the first and second walls being sealingly engaged to the annular edge member, the annular edge member having an opening for engaging the filter unit with the second opening of the filter platform; and a platform connection member located in association with the opening for engaging, the platform connection member being structured to sealingly engage the filter unit with the filter connection member of the platform.

In accordance with still another aspect of the present invention, there is provided a filter device comprising: (a) filter unit comprising: a substantially hollow filter pad having first and second walls made of filter material, and an annular edge member spacing apart the first and second walls, each of the first and second walls being sealingly engaged to the annular edge member, the annular edge member having an opening for allowing filtered air to pass out of the filter unit, and a platform connection member located in association with the opening for allowing filtered air to pass; and (b) a filter platform comprising: a substantially hollow outer housing, the housing forming a chamber within the platform, the housing having a first opening at one end of the housing for engaging the platform with a respirator so as to allow air to flow between the chamber and the respirator, and a second opening for engaging the platform with the air filter unit so as to allow filtered air to flow into the chamber; a respirator connection member located in association with the first opening, the respirator connection member being structured to sealingly engage the first opening to an input of the respirator; and a filter connection member located in association with the second opening, the filter connection member being structured to sealingly engage the second opening with the filter unit.

In accordance with another aspect of the present invention, there is provided a filter unit comprising: a substantially hollow filter pad having first and second walls made of filter material and an annular edge member spacing apart the first and second walls, each of the first and second walls being sealingly engaged either to each other or to the annular edge member fully or partially, the annular edge member having an opening and means for connecting the filter unit to a respirator or source of suction, with or without additional or intermediary connecting structure.

Additional objects and advantages of the present invention will become clear in view of the detailed description and the accompanying diagrams.

BRIEF DESCRIPTION OF THE DRAWINGS

FIGS. 10A–10D show a filter and filter cartridges in accordance with a fourth embodiment of the present invention.

DETAILED DESCRIPTION OF THE PREFERRED EMBODIMENTS

Preferred embodiments of the present invention for a filter unit, filter platform and filter device formed by the filter unit and filter platform will now be described with reference to the accompanying drawings.

The air filtration device of the present invention is designed to be coupled to a respirator mask and generally comprises a filter adapter platform coupled with one or more filter respirator cartridges or units. The filter device of the present invention employs advantageous structure which allows for filter units, in the form of cartridges, to have the filter material at both lateral sides of the filter unit completely unencumbered by an inhalation port or a connection device. By eliminating such elements, the full area of the filter material can be utilized for filtering, thus increasing airflow and reducing pressure drop. The advantageous design of the filter unit includes an annular edge member formed around the periphery of the filter unit. The edge member is an annular strip, preferably of rigid or semi-rigid material, to which the peripheral edges of each lateral wall of the filter are sealingly attached. The edge member maintains the space between the filter walls and provides structure for placement of an aperture for passage of filtered air to a stage of the filtration device closer to the respirator, that is, the source of suction. In the preferred embodiment to be described in more detail below, this closer stage is the filter platform of the present invention.

Another advantageous feature of the filtration device of the present invention is the provision of the filter platform itself between the filter unit or units and the respirator. As will be developed, the structure of the filter platform allows for placement of test probes as well as the introduction of materials to be inhaled by the user during use of the respirator. The filter platform, by its presence, allows for filter units to be designed with less concern for connector compatibility with the respirator mask. Thus, by providing an appropriate platform, filter units of one manufacturer may be able to be used with a respirator of a second manufacturer, even where such filters are typically not compatible with such respirators.

Figure 1A:
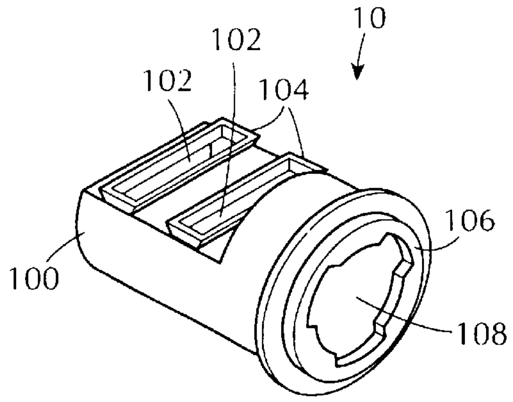
FIGS. 1A–1D constitute a solid model view, a top view, a side view and a front view, respectively of a respirator mask adaptor platform in accordance with a preferred embodiment of the present invention.

FIGS. 1A–1D show a respirator mask adapter platform that forms a part of the filter device according to a first embodiment of the present invention. As shown in FIG. 1A, the platform 10 includes a substantially hollow housing 100 preferably constructed of a strong, lightweight material such as plastic or aluminum. The platform has filter receiving openings 102 on an upper flat surface of the platform 10. Surrounding the filter receiving openings 102 are tapered filter connection members 104. The tapered connection members 104 are structured to mate with corresponding connectors on the filter cartridges to be discussed below to sealingly engage the filter cartridges, by means of sliding, with the platform 10. Mask connection member 106 is structured to mate with a corresponding member on a respirator (not shown) to sealingly engage the platform with the respirator.

The mask connection member 106 is shown in the figure as a bayonet style connector. However, both the filter connection member 104 and the mask connection member 106 may be of any connector type that allows for a secure seal, such as, for example, snap-on, press fit, push and twist, or the like. Chamber 108 is formed by the housing 100 and in use holds a residual volume of filtered air.

Figure 1B:
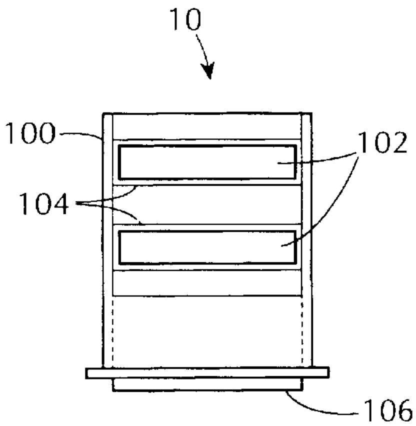
Figure 1C:
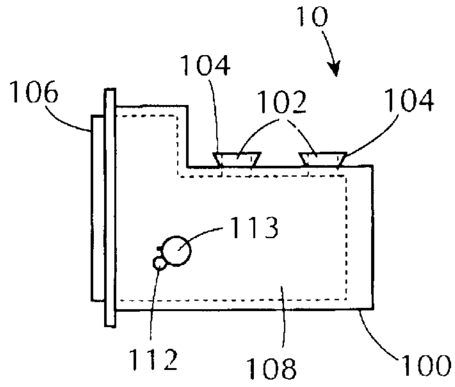
Figure 1D:
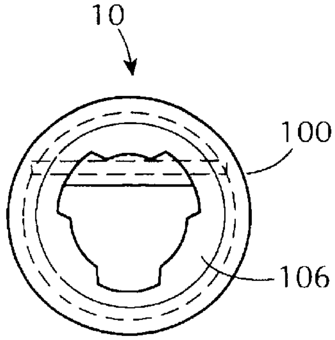

FIGS. 1B through 1D show the platform 10 from several different angles, with like reference numerals referencing like components. Probe port 112, visible in the side view of FIG. 1C, allows for the secure placement of a probe, such as an end of life probe or introduction of atomized medication, such as for asthma sufferers, into the platform, and eventually into the respirator. Port cover plate 113 is attached to the housing 100 so as to enable it to swing down to cover the port 112 when the port 112 is not in use. Of course, as will be appreciated, multiple ports and corresponding cover plates may be provided. The ports can be used to introduce a sensor to sense an increase in gas or vapor fumes as well as particles. The ports can also be used in conjunction with an emergency oxygen or compressed air support system.

Preferably, the sensing mechanism attached at the port or ports are sealed and locked in place by any known technique, such as snap-fit, press fit, push-and-twist, and the like.

Figure 2A:
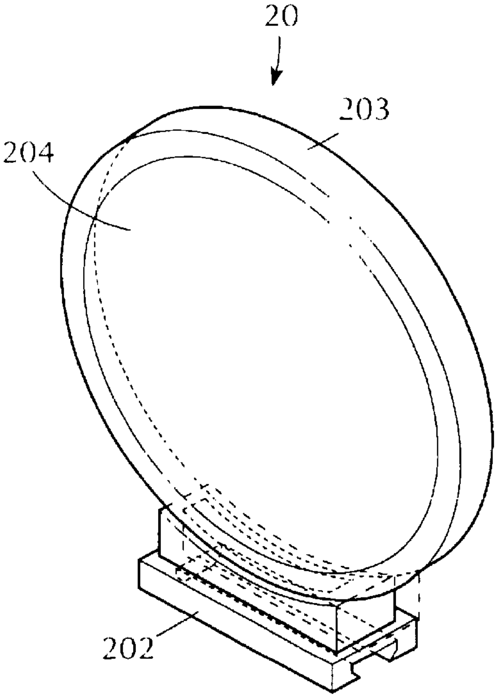
FIGS. 2A–2E constitute a solid model view, a bottom view, a right side view, a front view and a left side view, respectively, of a filter respirator cartridge of a preferred embodiment of the present invention.
Figure 2B:
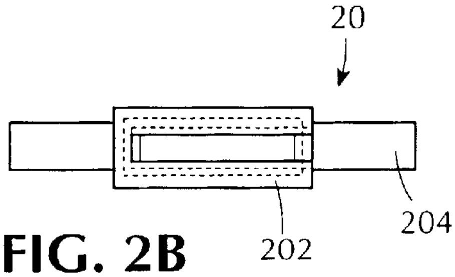
Figure 2D:
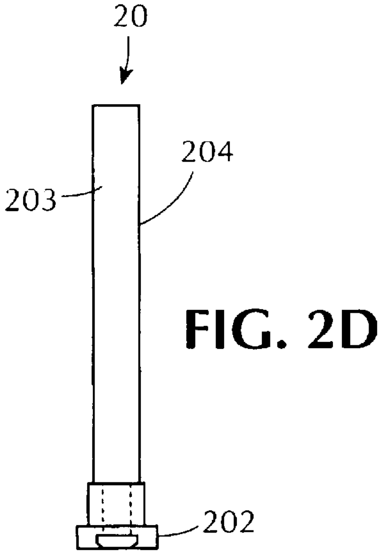
Figure 2C:
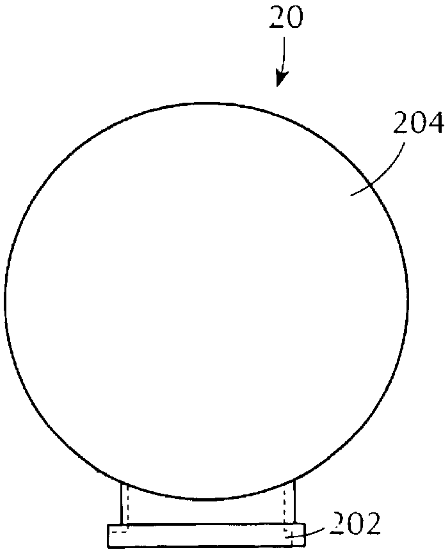
Figure 2E:
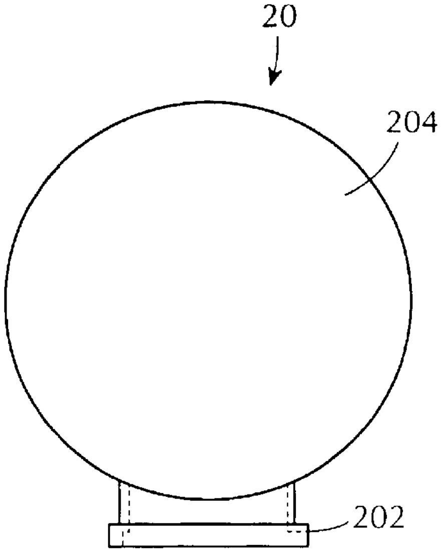

FIGS. 2A–2E show an individual filter cartridge in accordance with the first embodiment of the present invention. As shown in FIG. 2A, the filter cartridge 20 comprises filter disk 204, which is made of a filter material and which is substantially hollow. The disk 204 is apertured at the bottom of annular edge portion 203 and integrally engaged at that point along the edge portion 203 to connection member 202. The connection member 202 is structured to mate with tapered connection members 104 of the platform to sealingly engage the filter cartridge 20 to the platform 10 to form a filter device of the present invention. FIGS. 2B through 2E are bottom, right side, front and left side views, respectively, of the filter cartridge 20.

In a second embodiment of the filter platform of the present invention, the platform is provided with only one filter aperture. However, as will be seen, filter cartridges of single and dual nature will be illustrated, allowing, in the preferred embodiments, for a filter device having one or two filter disks. Of course, the invention is not limited to two filter disks and may include multiple disks, as will be understood after reading the specification.

Figure 3A:
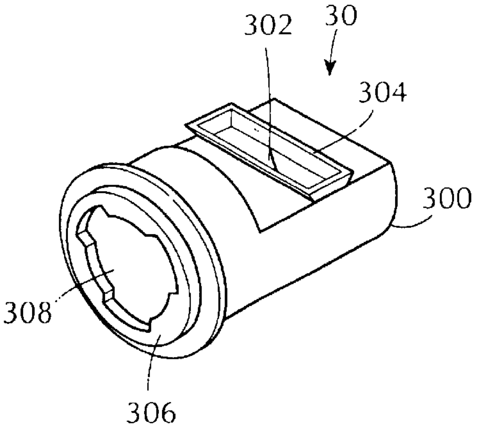
FIGS. 3A–3D constitute a solid model view, a top view, a side view and a front view, respectively of a respirator mask adaptor platform in accordance with another preferred embodiment of the present invention.

FIGS. 3A through 3D show a filter platform 30 according to the second embodiment. As shown in FIG. 3A, the platform 30 includes a substantially hollow housing 300 preferably constructed of a strong, lightweight material such as plastic or aluminum. The platform has filter receiving opening 302 on an upper flat surface of the platform 30. Surrounding the filter receiving opening 302 is tapered filter connection member 304. The tapered connection member 304 is structured to mate with corresponding connector on the single or dual filter cartridges to be discussed below to sealingly engage the filter cartridge, by means of sliding, with the platform 30. Mask connection member 306 is structured to mate with a corresponding member on a respirator (not shown) to sealingly engage the platform with the respirator. The mask connection member 306 is shown in the figure as a bayonet style connector. However, as in the first embodiment, both the filter and mask connection members may be of any type that allows for a secure seal. Chamber 308 is formed by the housing 300 and in use holds a residual volume of filtered air.

Figure 3B:
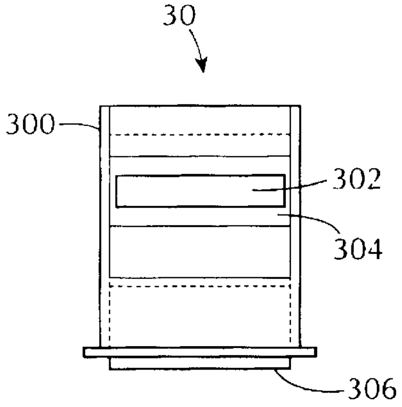
Figure 3C:
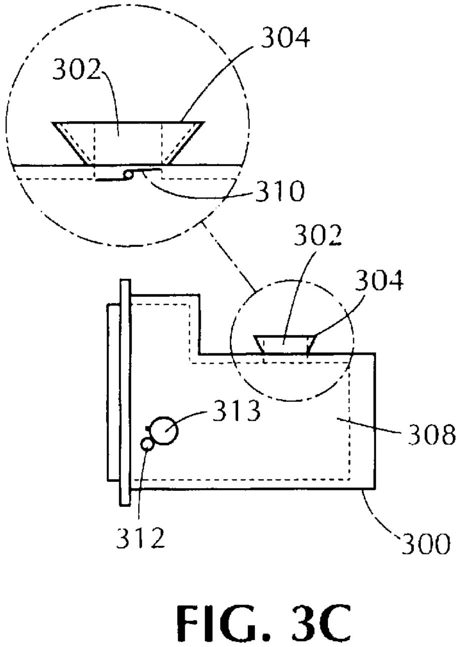
Figure 3D:
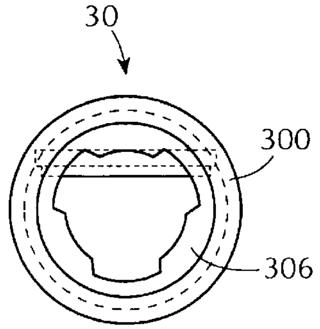

FIGS. 3B through 3D show the platform 30 from several different angles, with like reference numerals referencing like components. FIG. 3C shows butterfly valve 310 which blocks the entry of air into the platform when no filter cartridge is attached, such as when the cartridge is being changed. While not shown in conjunction with the first embodiment described above, the butterfly valve may also be used in that embodiment. The swivel axle of the butterfly valve 310 may protrude out of the housing to allow the user to twist the valve into the open and closed positions, as desired. The butterfly valve 310 is mounted at the air entry internal side of the platform's filter connection member 304. When activated in the open position, the butterfly portion of the valve will extend above the level of the connection member 304, preventing the filter cartridge from being removed. Only when the butterfly valve is in the closed and sealed position can a filter be removed, protecting the user from inhaling contaminated air. Probe port 312 and port cover plate 313 function the same way in the second embodiment as in the first and the description will not be repeated here.

Figure 4A:
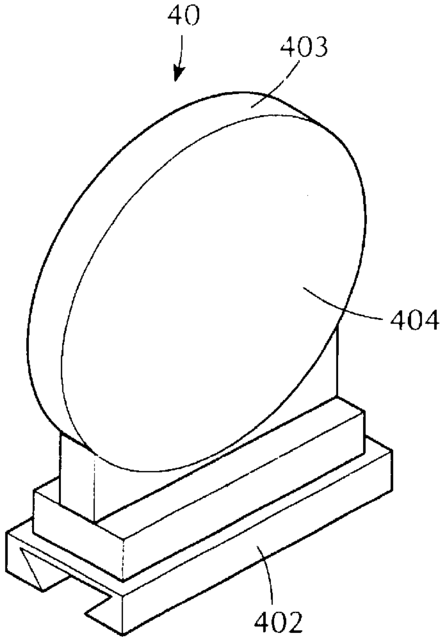
FIGS. 4A–4E constitute a solid model view, a bottom view, a right side view, a front view and a left side view, respectively, of a filter respirator cartridge of another preferred embodiment of the present invention.
Figure 4B:
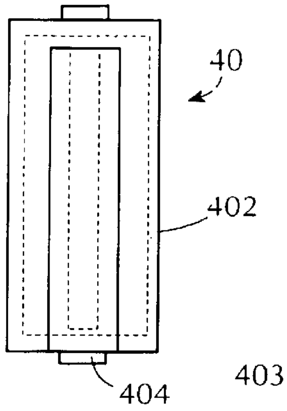
Figure 4D:
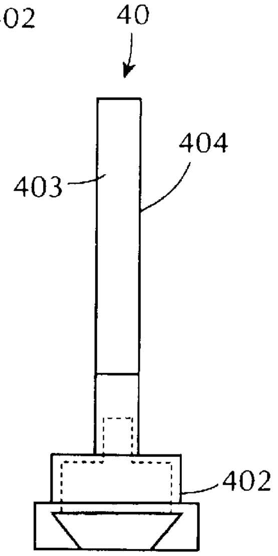
Figure 4C:
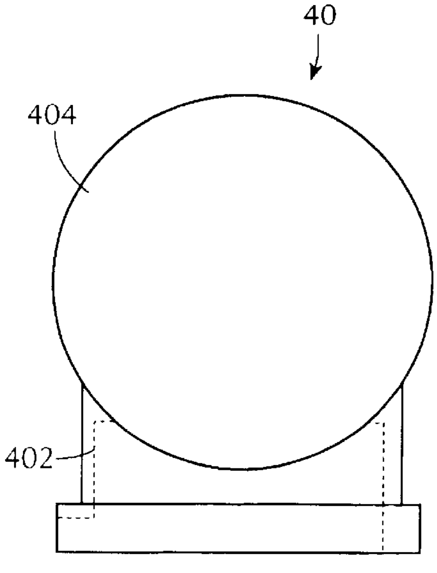
Figure 4E:
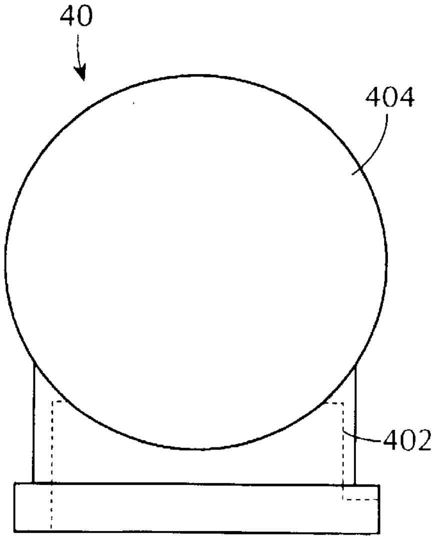

FIGS. 4A–4E show an individual filter cartridge 40 in accordance with the second embodiment of the present invention. As shown in FIG. 4A, the filter cartridge 40 comprises filter disk 404, which is made of a filter material and which is substantially hollow. The disk 404 is apertured at the bottom of annular edge portion 403 and integrally engaged at that point along the edge portion 403 to connection member 402. The connection member 402 is structured to mate with tapered connection member 304 of the platform to sealingly engage the filter cartridge 40 to the platform 30 to form a filter device of the present invention. FIGS. 4B through 4E are bottom, right side, front and left side views, respectively, of the filter cartridge 40.

Figure 5A:
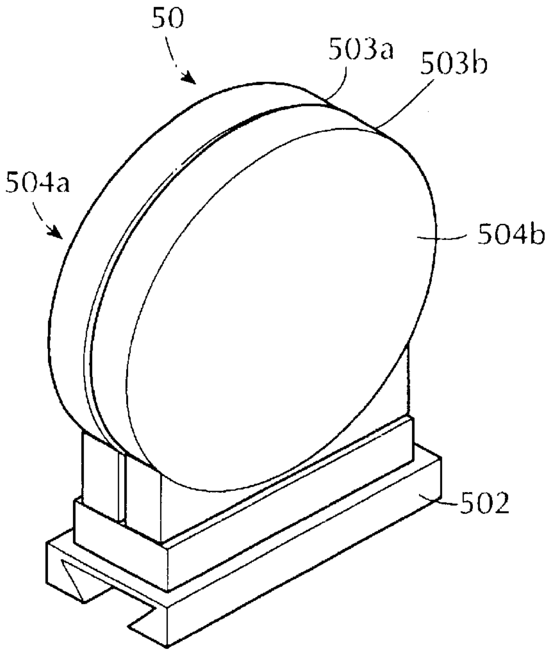
FIGS. 5A–5D constitute a solid model view, a bottom view, a side view and a front view, respectively, of a multiple filter respirator cartridge of a preferred embodiment of the present invention.
Figure 5B:
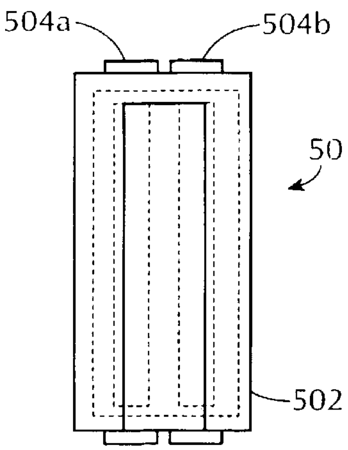
Figure 5C:
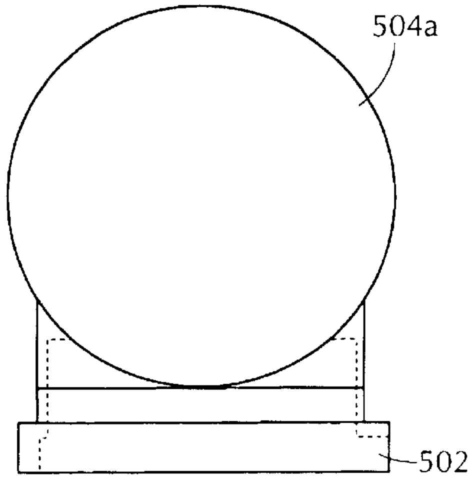
Figure 5D:
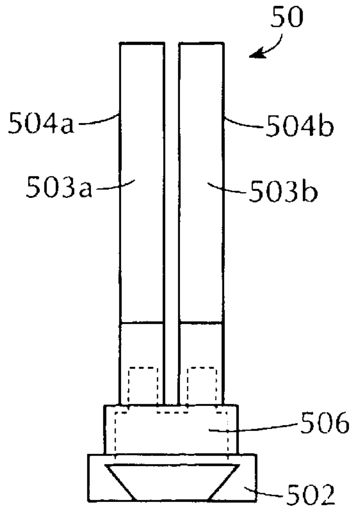

FIGS. 5A–5D show a multiple filter cartridge 50 in accordance with the second embodiment of the present invention. As shown in FIG. 5A, the filter cartridge 50 comprises filter disks 504*a* and 504*b*, each of which is made of a filter material and which is substantially hollow. The disks are apertured at the bottom of annular edge portions 503*a* and 503*b*, respectively, and integrally engaged at that point to connection member 502. The connection member 502 is structured to mate with tapered connection member 304 of the platform to sealingly engage the filter cartridge 50 to the platform 30 to form a filter device of the present invention. FIGS. 5B through 5D are bottom, side and front views, respectively, of the filter cartridge 50. As can be seen in FIG. 5B, a chamber 506 is formed at the base of connection member 502 in which filtered air resides. This air is drawn in upon receiving suction through the platform, the suction typically originating from the user's lungs.

Figure 6A:
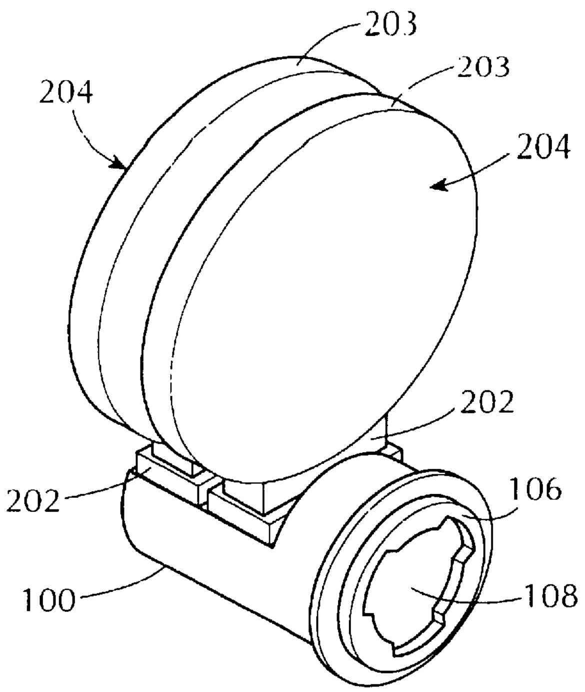
FIGS. 6A and 6B constitute a solid model view and a side view, respectively, of a filter device in accordance with the first embodiment of the present invention, combining the filter cartridges shown in FIGS. 2A–2E with the platform shown in FIGS. 1A–1D.
Figure 6B:
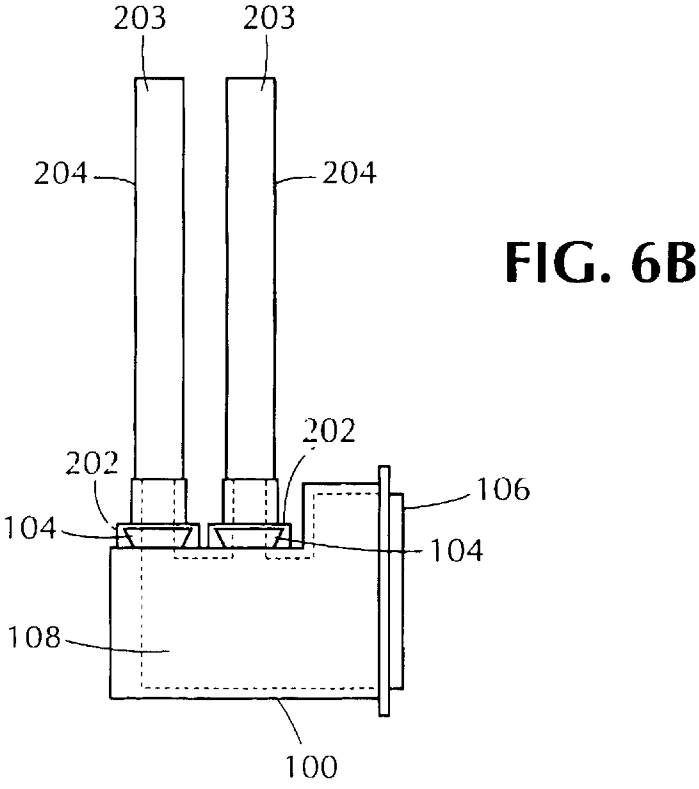

FIGS. 6A and 6B show a filter device according to the first embodiment of the present invention constructed of a platform 10 in accordance with the first embodiment, as was described above with reference to FIGS. 1A–1D, combined with two filter cartridges 20 in accordance with the first embodiment, as was described above with reference to FIGS. 2A–2E. As can be seen from FIG. 6A, each of the filter cartridges 20 is connected, by means of connection members 202 to the tapered filter connection members of the platform, which are visible in the side view of FIG. 6B. When combined, the filter cartridges are sealingly engaged to the platform such that when the user of the respirator breathes in, unfiltered air is drawn through the material of filter disks 204, down into the chamber 108 and out the front of the platform into the respirator. The presence of the volume of filtered air makes breathing easier due to the much lower pressure drop encountered during its inhalation. This can significantly increase the comfort of the user.

Figure 7A:
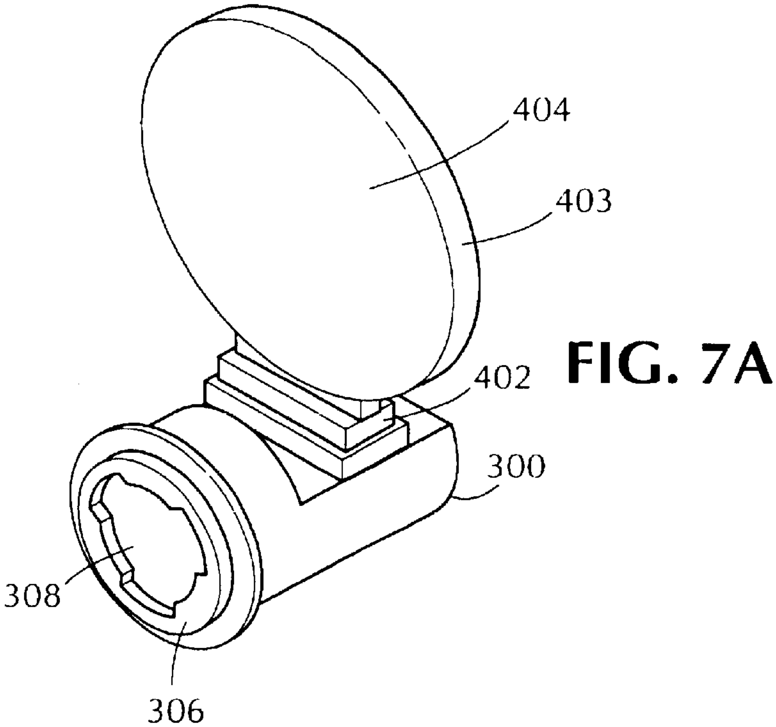
FIGS. 7A and 7B constitute a solid model view and a side view, respectively, of a filter device in accordance with the second embodiment of the present invention, combining the filter cartridge shown in FIGS. 4A–4E with the platform shown in FIGS. 3A–3D.
Figure 7B:
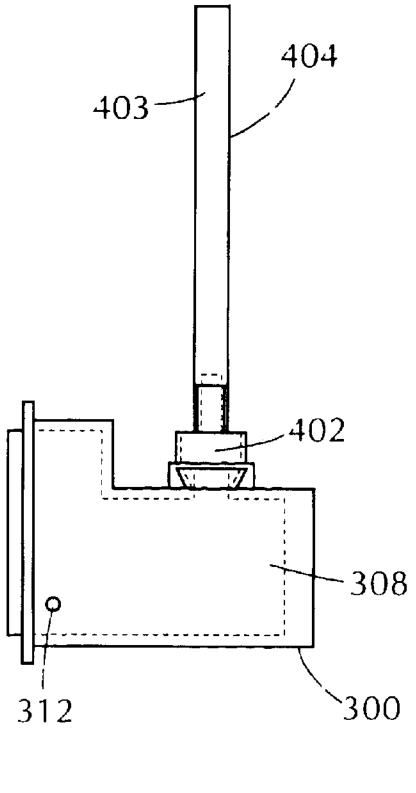

FIGS. 7A and 7B show a filter device according to the second embodiment of the present invention constructed of a platform 30 in accordance with the second embodiment, as was described in FIGS. 3A–3D, combined with a filter cartridge 40 in accordance with the second embodiment, as was described above with reference to FIGS. 4A–4E. As can be seen from FIG. 7A, filter cartridge 40 is connected, by means of connection member 402 to the tapered filter connection member 304 of the platform, which is visible in the side view of FIG. 7B. When combined, the filter cartridge is sealingly engaged to the platform such that when the user of the respirator breathes in, unfiltered air is drawn through the material of filter disk 404, down into the chamber 308 and out the front of the platform into the respirator. As mentioned above, the presence of the volume of filtered air makes breathing easier.

Figure 8A:
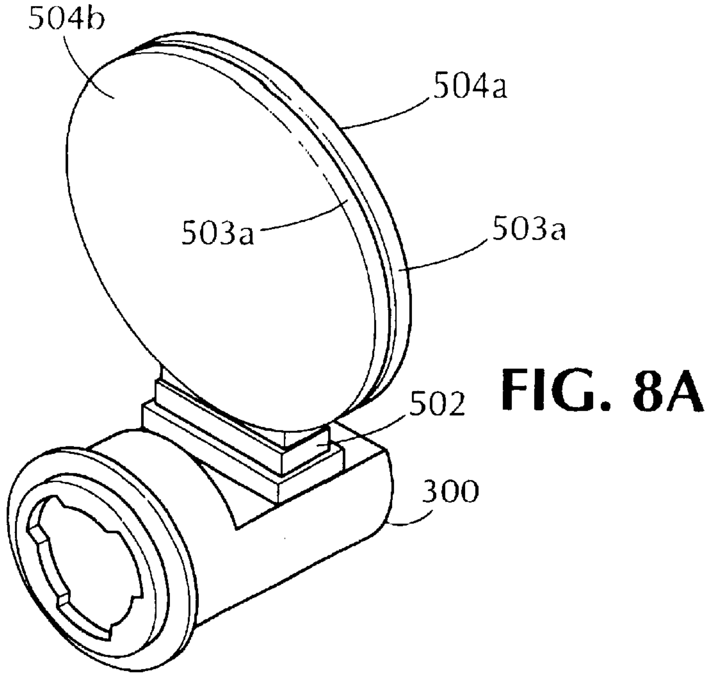
FIGS. 8A and 8B constitute a solid model view and a side view, respectively, of a filter device in accordance with the second embodiment of the present invention, combining the filter cartridge shown in FIGS. 5A–5D with the platform shown in FIGS. 3A–3D.
Figure 8B:
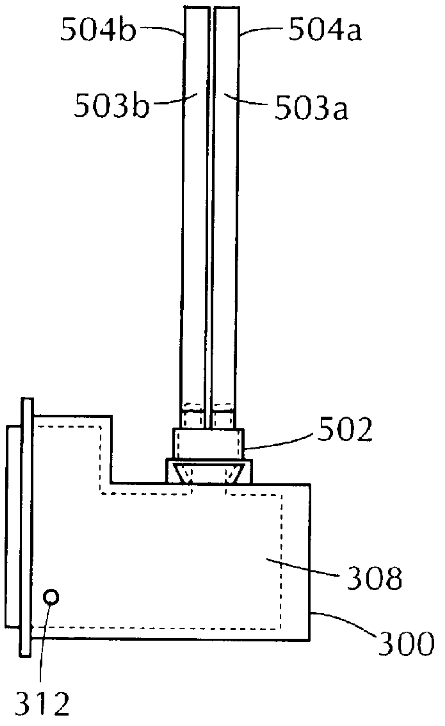

FIGS. 8A and 8B show a filter device according to the second embodiment of the present invention constructed of a platform 30 in accordance with the second embodiment, as was described in FIGS. 3A–3D, combined with dual filter cartridge 50 in accordance with the second embodiment, as was described above with reference to FIGS. 5A–5D. As can be seen from FIG. 8A, dual filter cartridge 50 is connected, by means of connection member 502 to the tapered filter connection member 304 of the platform, which is visible in the side view of FIG. 8B. When combined, the dual filter cartridge is sealingly engaged to the platform such that when the user of the respirator breathes in, unfiltered air is drawn through the material of filter disks 504*a* and 504*b*, down into the chamber 308 and out the front of the platform into the respirator.

Figure 9A:
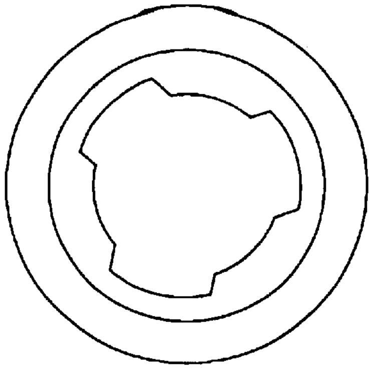
FIGS. 9A–9J show a filter platform and filter cartridges, separately and together and in combination with a respirator mask, in accordance with a third embodiment of the present invention.
Figure 9B:
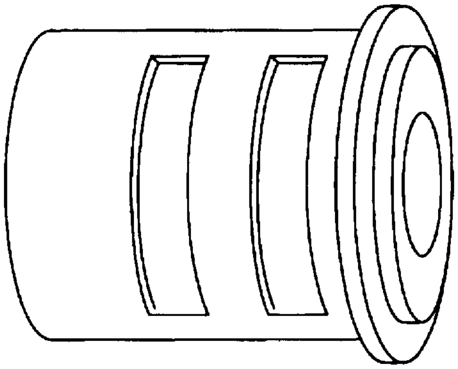
Figure 9C:
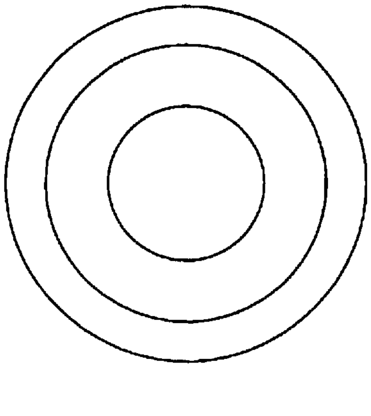

FIGS. 9A–9J illustrate a filter platform and filter cartridges in accordance with a third embodiment of the present invention. As shown in FIGS. 9A–9C, the filter adaptor platform of the third embodiment is generally cylindrical in shape with slots cut out for the installation of filter cartridges. The platform is open at an end for connection to the respirator, and provided with a connector to sealingly engage a corresponding connector on the respirator. The other end of the platform is closed. Slots are provided to sealingly engage, by any known connection technique, the filter cartridges.

Figure 9D:
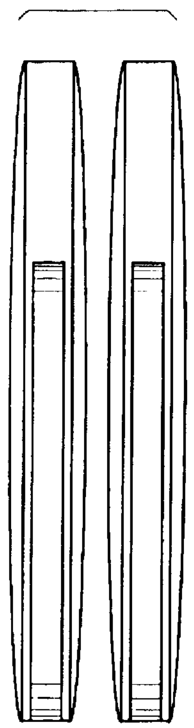
Figure 9E:
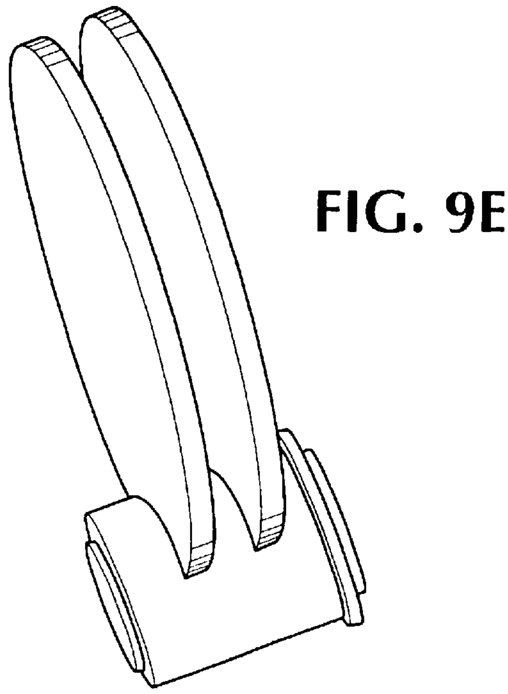
Figure 9F:
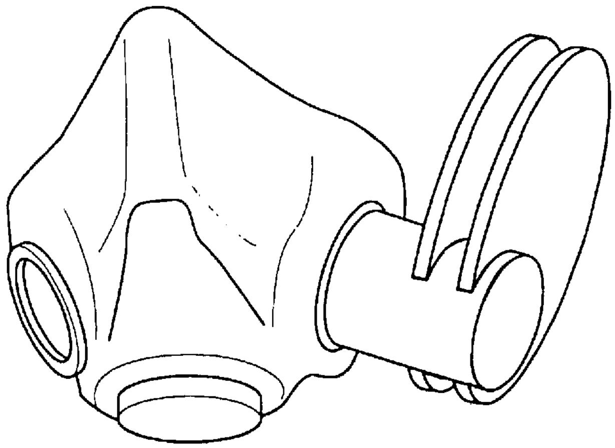
Figure 9G:
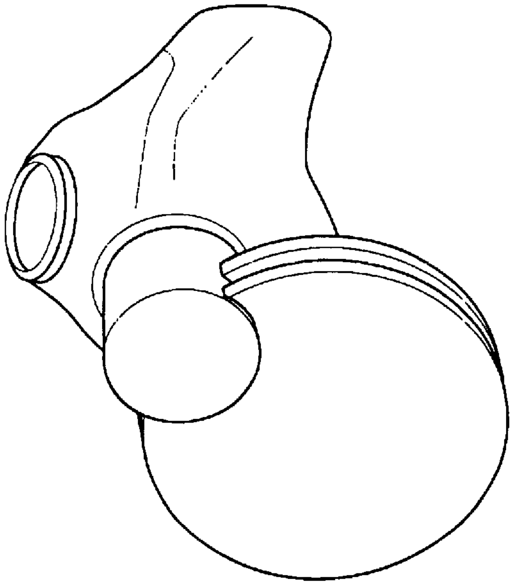
Figure 9H:
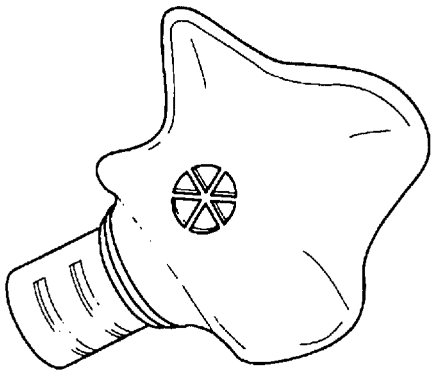
Figure 9I:
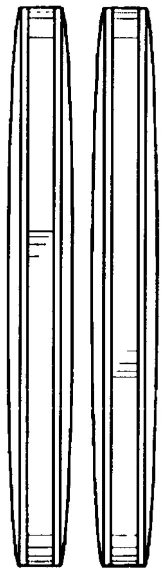
Figure 9J:
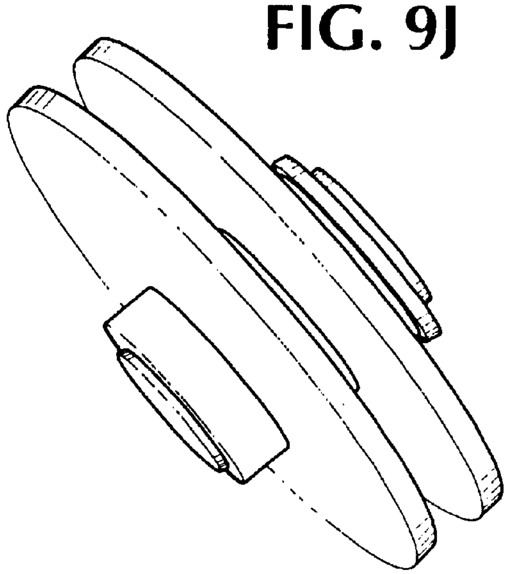

FIGS. 9D and 9E show individual filter cartridges in accordance with the third embodiment. As in the first and second embodiments, an annular edge member is provided to space apart the filter walls of the filter disks. The edge member also has an aperture to allow the passage of filtered air into the platform. FIG. 9E shows the filter device in accordance with the third embodiment with the filter cartridges engaged with the platform. FIGS. 9F–9H show the filter device of the third embodiment engaged to a respirator mask. In a variation of the third embodiment, as shown in FIGS. 9I and 9J, more than one filter disk can be made into a single cartridge, with the apertures of each disk being joined in a common connector for mating with the platform.

FIGS. 10A–10D show a filter cartridge and filter adapter platform in accordance with a fourth embodiment of the present invention. As can be seen from the figures, in the fourth embodiment, the connector at the opening of the filter unit mates with a protruding connector on the platform to form the filter device of the fourth embodiment of the present invention. Each of the third and fourth embodiments function similarly to the first and second embodiments and the description of the functions will not be repeated here.

Figure 11:
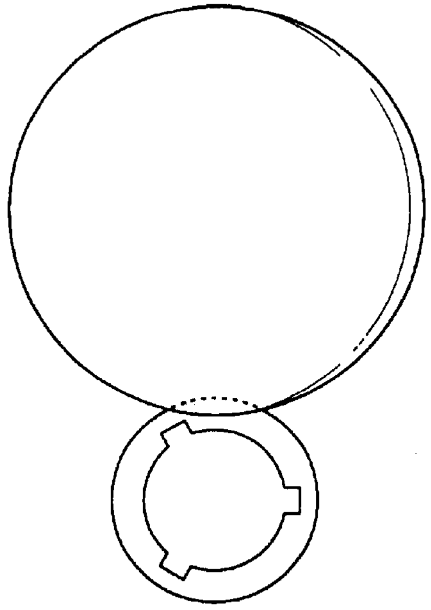
FIGS. 11 and 12 illustrate a filter device in accordance with a fifth embodiment of the present invention.

FIG. 11 shows a fifth embodiment of the present invention. According to the fifth embodiment, the filter pad and the double-sided adapter/connector are manufactured separately and then sealed together at the edge/periphery of the filter pad to form the filter device. The edge of the filter pad and the adapter/connector each have an opening. These two openings are joined to form a channel when the pad and the adapter are sealed together. The pad and the adapter can be sealed by any appropriate sealing method, such as glueing, ultrasonic welding, or the like. Although only one pad is shown in the figure, the same technique can be applied to form devices having multiple pads. Filter material is present on both sides of each filter pad prior to assembly of the filter device. The adapter/connector is structured so that it can connect to a mask or respirator on one side and to either an additional stage of the same filter on the other side, or a blind end cap to seal the outer most stage if no additional units are to be connected. This embodiment advantageously allows the filter pad or pads to be connected to the mask or respirator without the need for a separate filter/mask platform.

Figure 12:
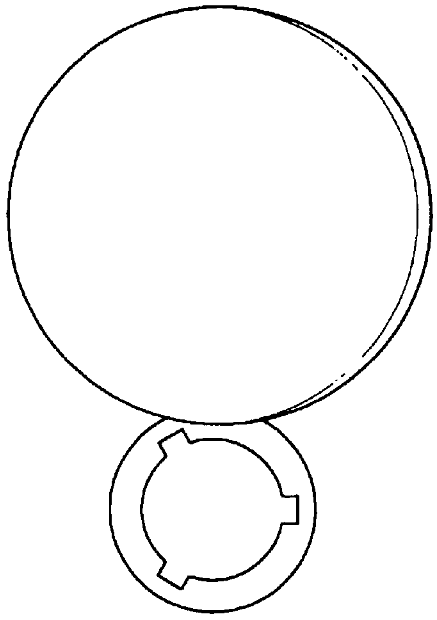

FIG. 12 shows a variation on the fifth embodiment in which the annular edge portion of the filter pad and the double sided connector/adapter are formed as one integral part. In this variation, the filter material is then added to annular edge portion to form the filter pad and complete the filter device. As before, the double sided adapter/connector allows for the connection of one or more stages of filters, with a blind end cap, or similar cap, at the outermost opening. Again, the structure eliminates the need for a separate filter platform.

Since the lung capacity of the wearer is a fixed parameter for all practical purposes, a fixed volume of air is drawn through a relatively large area of filtering material, the effective air speed passing through reduces drastically. Because of this reduced speed, filtration efficiency increases significantly. Hence this invention not only reduces pressure drop and breathing comfort, but also increases the filtration efficiency, and hence the breathing protection, at the same time. Together, these advantages allow users to breathe more comfortably even in situations that would make extended periods of activity impracticable with prior art filters. Importantly, because of the absence of an aperture in the middle of the surface area of each filter disk, and with the capability to employ multiple filter disks and/or cartridges, the present invention can provide markedly increased surface area and improved performance without interfering with a user's vision or mobility.

Of course, the filter devices described above are merely preferred embodiments of the broader invention disclosed herein. A wide variety of other embodiments are possible, as would be appreciated by those skilled in the art after learning of the present invention. Although the filters described in the foregoing discussion are generally disk-shaped, they could assume many shapes. In addition, although dual filtration is shown in the preferred embodiments, the present invention provides for the ability to use multiple filter disks and/or cartridges and is not limited to the use of two such elements.

It will be appreciated that filter devices often are used in adverse conditions where the filter material could be cut, torn, or otherwise damaged. In view of this, although it is not shown in the figures, it should be clear that it would be well within the scope of the invention to encase the filter devices in an air-permeable protective casing. For example, the filter devices could be shielded by a perforated plastic or metal shell, individually or collectively.

It should be noted that while the invention has been described with respect to certain preferred embodiments, it would be apparent to those skilled in the art that changes and modifications may be made without departing from the scope of the invention. With this in mind, the appended claims define the scope of the invention, which is not limited to the preferred embodiments disclosed herein. These claims should be deemed to include all to include all equivalent constructions insofar as they do not depart from the spirit and scope of the present invention.

What is claimed is:

1. A filter platform for allowing attachment of a plurality of air filter units thereto, the filter platform comprising:

a substantially hollow outer housing, the housing forming a chamber within the platform, the housing having a first opening for engaging the platform with a respirator so as to allow air to flow between the chamber and the respirator, and one or more second openings for engaging the platform with the plurality of air filter units so as to allow filtered air to flow simultaneously into the chamber through each of the plurality of air filter units;

a respirator connection member located in association with the first opening, the respirator connection member being structured to sealingly engage the first opening to an input of the respirator; and a filter connection member located in association with the one or more second openings, the filter connection member being structured to sealingly engage the one or more second openings with the plurality of filter units.

2. A filter platform according to claim 1, wherein the housing has a third opening, the third opening having means for opening and closing the third opening, said third opening being adapted to selectively receive a sensor or structure for introduction of injectables into the chamber.

3. A filter unit comprising:

a substantially hollow filter pad having first and second walls made of filter material, and an annular edge member spacing apart the first and second walls, each of the first and second walls being sealingly and integrally engaged to the annular edge member, the annular edge member having an opening for allowing filtered air to pass out of the filter unit, the annular edge member extending around part or all of the periphery of the filter pad, and a connection member located in association with the opening, for connecting the filter unit to a source of suction.

4. A filter unit for filtering air to be fed to a respirator through a filter platform comprising an outer housing, the housing forming a chamber within the filter platform, the housing having a first opening at one end of the housing for engaging the platform with a respirator so as to allow air to flow between the chamber and the respirator, and a second opening for engaging the platform with the air filter unit so as to allow filtered air to flow into the chamber; a respirator connection member located in association with the first opening, the respirator connection member being structured to sealingly engage the first opening to an input of the respirator; and a filter connection member located in association with the second opening, the filter connection member being structured to sealingly engage the second opening with the filter unit, the filter unit comprising:

a substantially hollow filter pad having first and second walls made of filter material, and an annular edge member spacing apart the first and second walls, each of the first and second walls being sealingly and integrally engaged to the annular edge member, the annular edge member having an opening for engaging the filter unit with the second opening of the filter platform; and a platform connection member located in association with the opening for engaging, the platform connection member being structured to sealingly engage the filter unit with the filter connection member of the platform.

5. A filter device comprising:

(a) one or more filter units, each comprising:

one or more substantially hollow filter pads, each having first and second walls made of filter material, and an annular edge member spacing apart the first and second walls, each of the first and second walls being sealingly and integrally engaged to the annular edge member, the annular edge member having an opening for allowing filtered air to pass out of the filter unit, and a platform connection member located in association with the opening of each of said one or more plural filter pads for allowing filtered air to pass; and (b) a filter platform comprising:

a substantially hollow outer housing, the housing forming a chamber within the platform, the housing having a first opening of the housing for engaging the platform with a respirator so as to allow air to flow between the chamber and the respirator, and one or more second openings for engaging the platform with the one or more filter units so as to allow filtered air to flow into the chamber;

a respirator connection member located in association with the first opening, the respirator connection member being structured to sealingly engage the first opening to an input of the respirator; and a filter connection member located in association with the one or more second openings, the filter connection member being structured to sealingly engage the one or more second openings with the one or more filter units.

6. A filter unit comprising:

a substantially hollow filter pad having first and second walls made of filter material and an annular edge member spacing apart the first and second walls, each of the first and second walls being sealingly and integrally engaged either to each other or to the annular edge member fully or partially, the annular edge member having an opening and means for connecting the filter unit to a respirator or source of suction.

7. A filter unit according to claim 6, wherein said filter unit is structured to allow connection to the respirator or source of suction in parallel with, or at predetermined orientations, angles and positions with respect to the respirator or source of suction, with or without additional or intermediary connecting structure.

* * * * *